(No Model.) 2 Sheets—Sheet 1.

C. H. LATHAM.
GRASS RECEPTACLE.

No. 435,183. Patented Aug. 26, 1890.

Witnesses.
Lauritz M. Möller
John R. Snow

Inventor.
Charles H. Latham
by his attorneys,
Maynadier & Beach.

THE NORRIS PETERS CO., PHOTO-LITHO., WASHINGTON, D. C.

(No Model.) 2 Sheets—Sheet 2.
C. H. LATHAM.
GRASS RECEPTACLE.
No. 435,183. Patented Aug. 26, 1890.
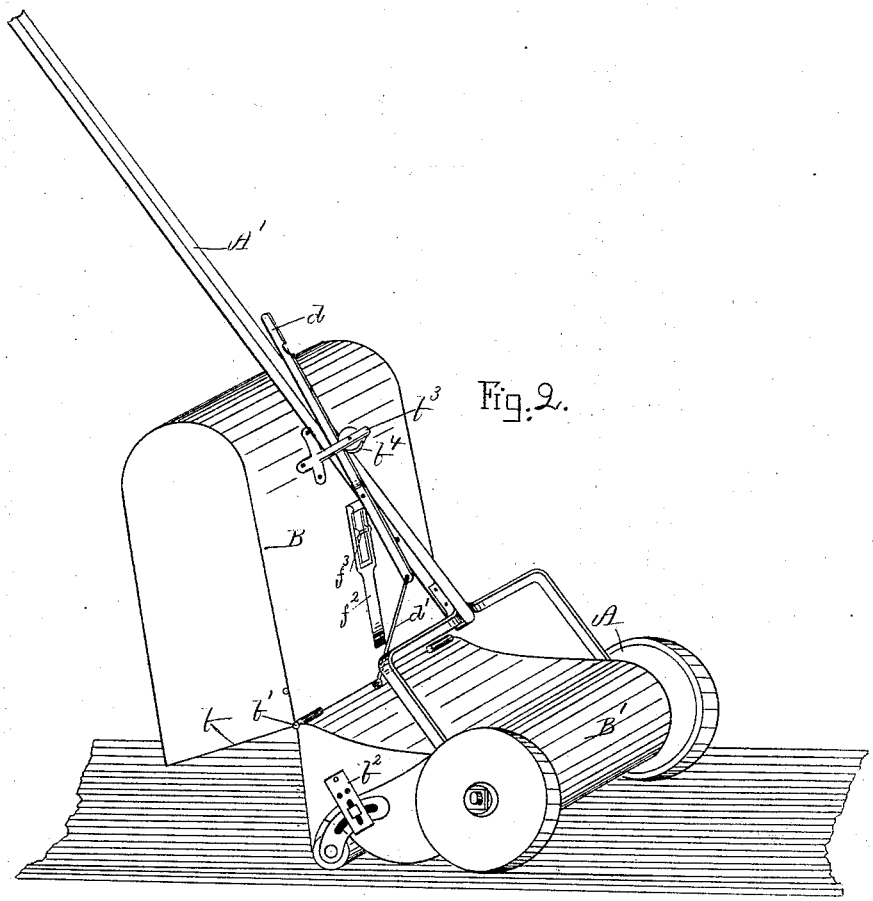
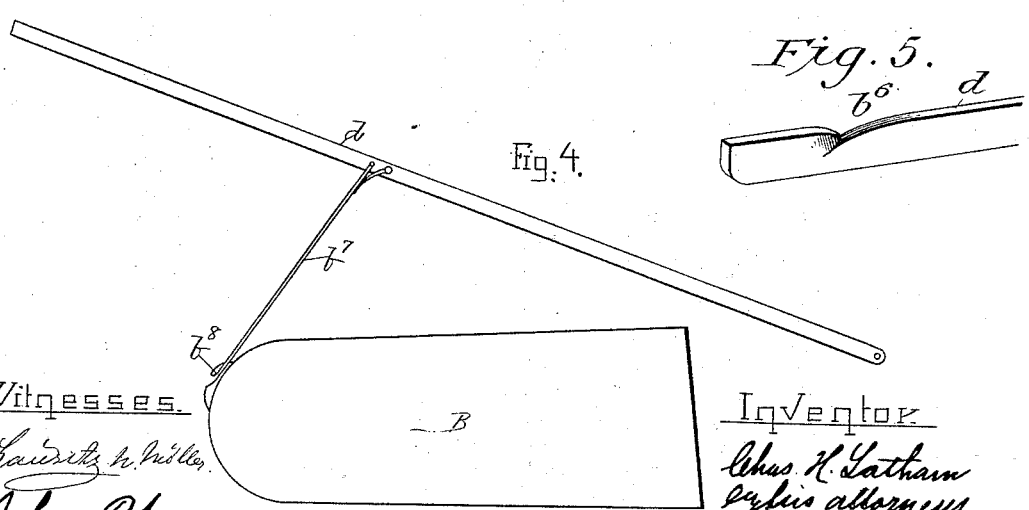

UNITED STATES PATENT OFFICE.

CHARLES HENRY LATHAM, OF LANCASTER, MASSACHUSETTS, ASSIGNOR OF ONE-HALF TO JOHN O. STEVENS, OF NEW YORK, N. Y.

GRASS-RECEPTACLE.

SPECIFICATION forming part of Letters Patent No. 435,183, dated August 26, 1890.

Application filed March 7, 1890. Serial No. 342,969. (No model.)

*To all whom it may concern:*

Be it known that I, CHARLES HENRY LATHAM, of Lancaster, in the county of Worcester and State of Massachusetts, have invented a new and useful Improvement in Mowers, of which the following is a specification, reference being had to the accompanying drawings, in which—

Figure 1:
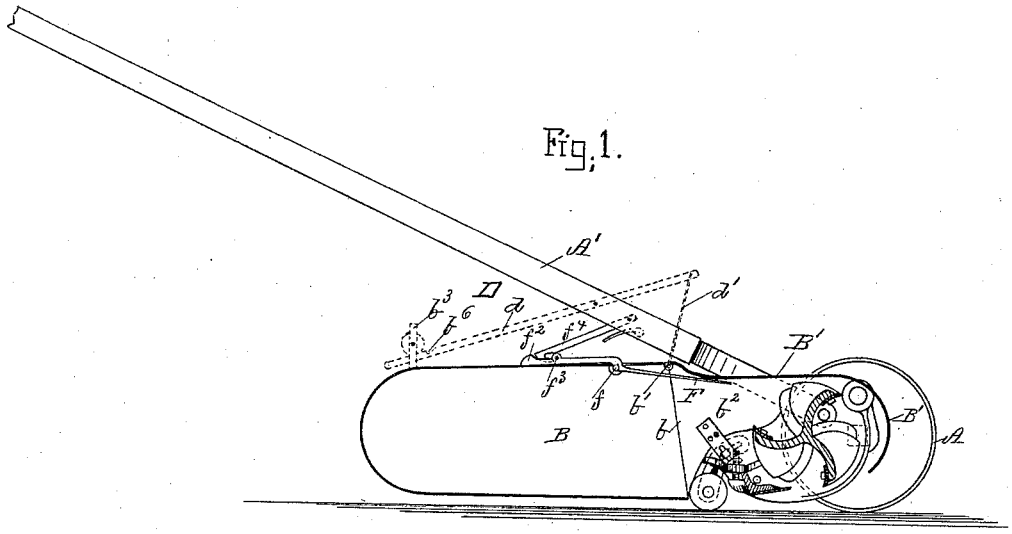
Figure 3:
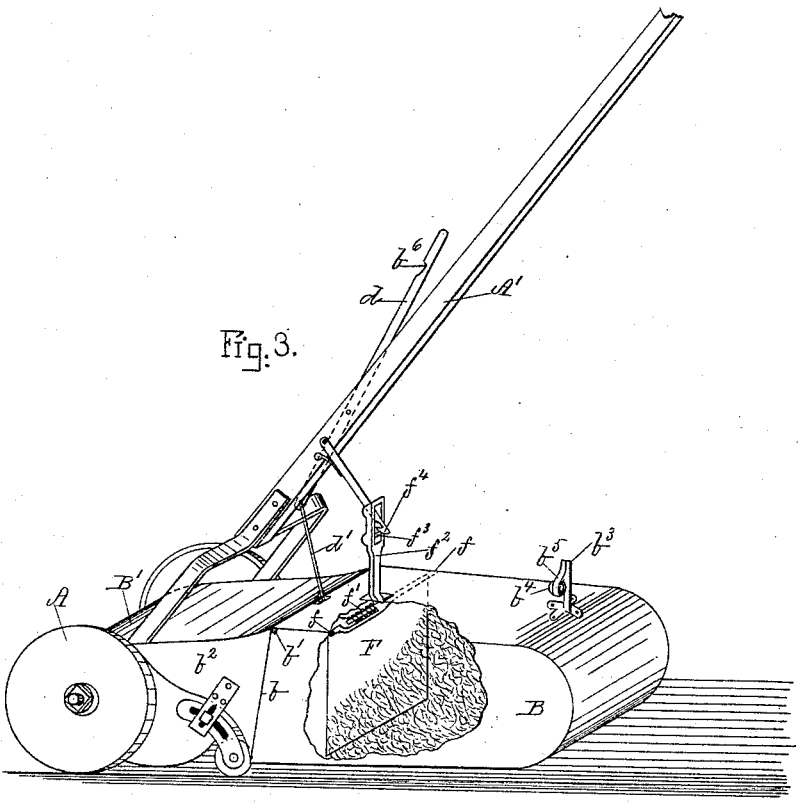

Figure 1 is a sectional elevation of a machine embodying my invention. Fig. 2 is a perspective view of the same. Fig. 3 is a perspective, a part being broken away to show an interior part of the machine. Fig. 4 illustrates a modification. Fig. 5 is a perspective of a part of the lever, showing the offset therein.

My invention is shown embodied in a lawn-mower; and it consists, mainly, in the combination of a mower with a box-receiver which receives the grass as fast as cut.

Minor features of my invention will be set forth hereinafter.

In the drawings, the mower proper is marked A, and is typical of movers known as "lawn-mowers." As the mower proper forms no part of my invention, I do not describe it herein, and show only so much of it as is necessary for an understanding of my invention.

In carrying out my invention I secure to the mower A, on the rear thereof, a box receiver B, having a mouth $b$, through which grass is thrown into the receiver as fast as cut. Receiver B is best connected to mower A by hinging it at $b$ to a rod $b'$, connecting cheek-pieces $b^2$, mounted on the mower. A guard B' extends over the mower's cutter and guides the cut grass into the receiver, and also prevents the grass from flying about as it is cut. Receiver B is conveniently emptied by turning it on the hinges, as shown in Fig. 2. It is mounted at the rear of the cutter, as shown, because the receiver does not then prevent the mower from being run close up to a fence or the like. It is desirable to connect receiver B to the handle of the mower, so that the handle, when lifted, as shown in Fig. 2, carries the receiver into position for emptying it. The connection D may be of several different forms. In those mowers the handles of which cannot be turned freely on their supports, except for a short distance, it is desirable to fulcrum a lever $d$ to the handle A', connect its end nearest the mower to a rod $d'$, in this case secured to the rod $b'$, and adapt its other end for engagement with a bracket $b^3$ on receptacle B. I prefer to provide bracket $b^3$ with a roll $b^4$, which rides on the upper edge of lever D when handle A' is lifted to empty receptacle B. When the mower is used, the lever $d$ is not connected with receptacle B, because if it were the receptacle would be constantly moved on its hinges and grass allowed to fall out. To connect the handle and receptacle for emptying the receptacle, the handle is depressed to carry the outer end of the lever $d$ into engagement with the roll $b^4$, the lever sliding over the incline $b^5$ into engagement with the roll. When, after emptying the receptacle, handle A' is moved back to its normal position, the roll $b^4$ runs back on lever $d$ and off the lever at the offset $b^6$. The offset is formed to allow the roll to run off the lever by narrowing the lever—that is, by narrowing the track near the shoulder of the offset. When the roll is on the narrowed portion of the lever and strikes the shoulder of the offset, it readily leaves the track, being aided thereto by vibration of the lever. This will be readily understood from Fig. 5. In other forms of mowers—that is, those in which the handle is turned freely on its support from one side of the cutter to the other—the connection $d$ may be a simple loop $b^7$ and hook $b^8$, as shown in Fig. 4.

In some cases I combine with the receptacle a pusher, which is actuated by moving the handle of the mower to push the cut grass back into the receptacle. The pusher F is conveniently mounted on journals $f$ in the side walls of receptacle B with its free edge normally under the guide B', being readily kept in this position by a spring $f'$. By moving handle A' the tension of spring $b'$ is overcome and the pusher moved on its journals to push back the cut grass, the handle and pusher being connected in any suitable manner—say by arm $f^2$—there being a cross-piece $f^3$ on the pusher and a hook $f^4$ on handle A'. The parts are so proportioned that the handle may be moved to actuate the pusher without tilting the receiver, as will be plain to all skilled in the art.

I am aware that mowers have been made with open pans to receive the cut grass; but mowers embodying my invention differ radically from such mowers. My receiver being a covered receptacle prevents the cut grass from flying about after being cut.

I am also aware that mowers have been made with a box-like receiver mounted on the front side of the cutter; but such mowers are objectionable, because they can not be run close up to the sides of fences and buildings; and my invention is an improvement on mowers of this class.

What I claim is—

In a lawn-mower, the combination of the handle, a box receiver open at its front end mounted at the rear of the mower, and a connection connecting the receiver and handle, the receiver being hinged at its upper front corners to the mower, substantially as and for the purpose set forth.

CHARLES HENRY LATHAM.

Witnesses:
EDWARD S. BEACH,
JOHN R. SNOW.